R. B. TENNEY, Jr.
SIGNALING DEVICE.
APPLICATION FILED OCT. 12, 1909.
990,683.
Patented Apr. 25, 1911.
2 SHEETS—SHEET 1.
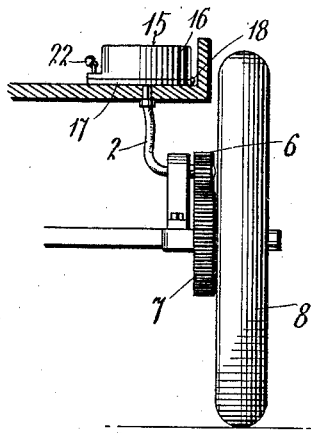
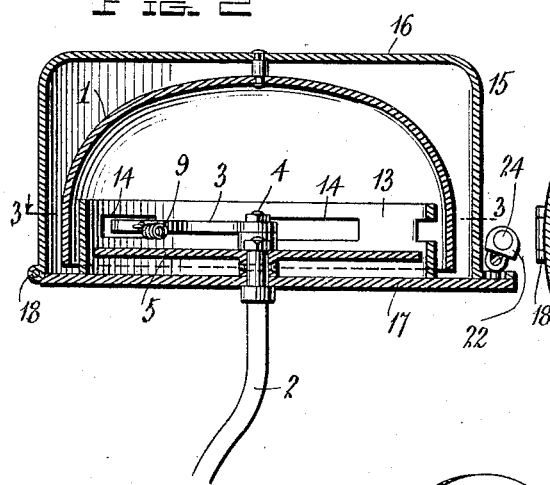
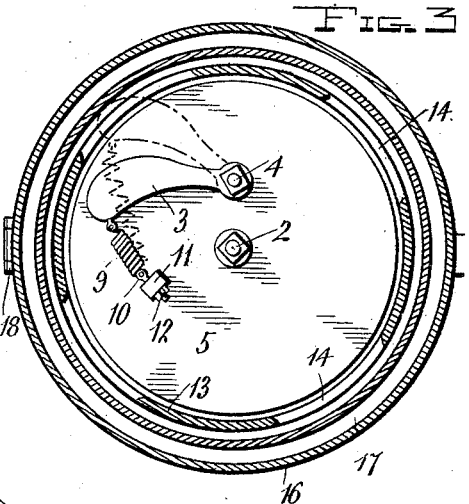
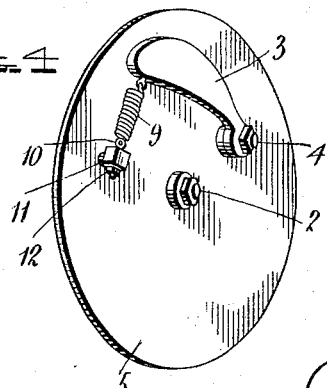
Witnesses
Inventor
Robert B. Tenney, Jr.
By Harwell C. McCarteney
Attorney R. B. TENNEY, Jr.
SIGNALING DEVICE.
APPLICATION FILED OCT. 12, 1909.
990,683.
Patented Apr. 25, 1911.
2 SHEETS—SHEET 2.
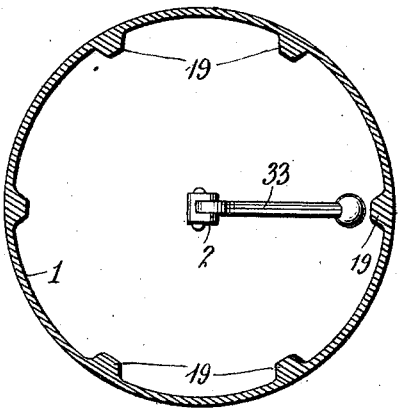
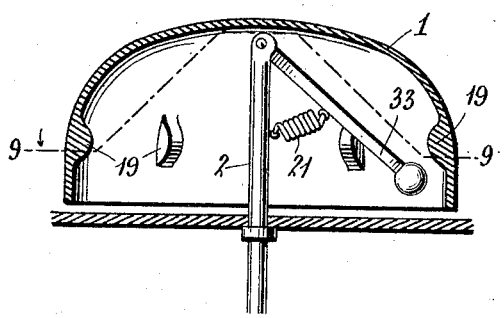
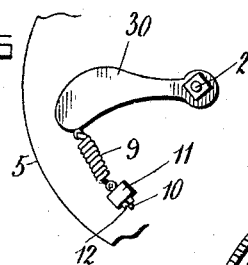
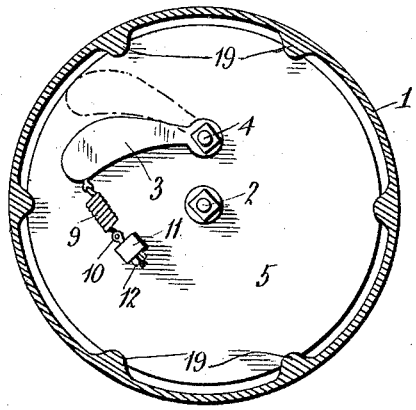
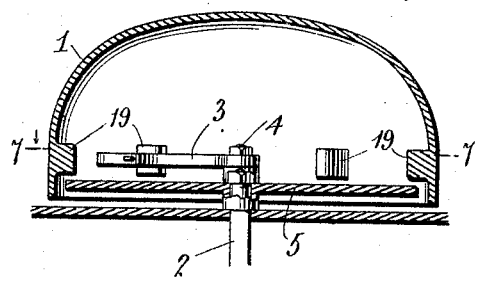
Witnesses
Robert B. Tenney, Jr. Inventor
By Hartwell C. McCartney
Attorney
THE NORRIS PETERS CO., WASHINGTON, D. C.

UNITED STATES PATENT OFFICE.

ROBERT B. TENNEY, JR., OF SCHENECTADY, NEW YORK.

SIGNALING DEVICE.

990,683.　　　　　　Specification of Letters Patent.　　Patented Apr. 25, 1911.

Application filed October 12, 1909. Serial No. 522,299.

*To all whom it may concern:*

Be it known that I, ROBERT B. TENNEY, Jr., a citizen of the United States, residing at Schenectady, in the county of Schenectady, State of New York, have invented certain new and useful Improvements in Signaling Devices, of which the following is a specification.

The present invention is an improvement in signaling devices, and its principal object, broadly stated, comprehends the production of an extremely simple, inexpensive, durable and effective device of the class specified designed primarily for attachment to a motor car and for automatic operation when the speed at which the car is traveling reaches a predetermined point, so as to notify the driver to reduce the speed.

At the present time, the speed at which a car may be driven is regulated by law in most localities, as is generally understood. These regulations are, as a rule, strictly enforced, this being especially true of such as relate to travel within the limits of a town or city, and their violation renders the offender subject to arrest and fine. It has, accordingly, become the custom to equip cars with speedometers or similar instruments to constantly indicate the rate of speed, but since the attention of the driver is ordinarily fixed upon the road ahead, it frequently happens that he neglects to watch the indicator and thus unconsciously exceeds the speed limit. On the other hand, if an audible signal were substituted for the noiseless indicator above referred to, it will be apparent that the actuation of such signal would of necessity warn the driver that the speed limit had been exceeded and that the car should be slowed down.

It may be stated, therefore, that this invention resides essentially in the production of an audible signal attachment for motor cars and the like, such attachment having a positive operative connection with one of the car wheels so as to admit of its automatic actuation when the prescribed speed limit is reached. It is also an important object of the invention to provide a signal attachment of the type stated, which is wholly mechanical in its construction and operation, and which, as such, does not depend for its operation upon any uncertain force, as a current of air or electricity.

The invention further resides in the employment of a case or housing within which the operating elements of the device are inclosed, it being the purpose of the invention to make use of a two-part case or housing which may be locked and sealed by a government official after the device itself has been tested.

Finally, the invention comprehends the production of an instrument of the type described which is designed for complete detachment from the car so as to admit of its being officially tested and adjusted to conform to the statutory requirements of a particular locality.

Briefly described, the device comprises a resonant metal body, preferably bell-shaped, and a rotatable impact member driven at a speed directly proportional to that of the car and operable by centrifugal force to strike against and sound said body. The impact member is mounted eccentrically with reference to the driving member of the device, and may be either directly connected to the latter member or carried by a rotating support secured thereto.

The invention also contemplates the coating of either the operating end of the impact member or the inner surface of the resonant body, so that upon the actuation of the device a mark will be made upon said end or surface, thereby positively evidencing such actuation.

The invention will be readily understood from a consideration of the following description and the accompanying drawings, in which latter its practical embodiment is illustrated. It is to be understood, however, that no limitation to the exact details of construction shown and described, is intended, since modifications and changes may obviously be made within the scope of the appended claims.

Of the drawings: Figure 1 is a fragmental diagrammatic view illustrating the position of the device when attached to a car. Fig. 2 is an enlarged vertical sectional view taken centrally through one form of the device. Fig. 3 is a horizontal section taken on the line 3—3 of Fig. 2. Fig. 4 is a perspective view of the rotating disk by which the impact member is carried. Fig. 5 is a fragmental horizontal sectional view showing the impact member carried by the drive shaft. Fig. 6 is a central vertical sectional view of a modified form of the invention. Fig. 7 is a horizontal section taken on the line 7—7 of Fig. 6. Fig. 8 is a central vertical sectional view of a further modification. Fig. 9 is a horizontal section taken on the line 9—9 of Fig. 8.

Reference being had to the drawings and the numerals marked upon the same, it will be seen from an inspection thereof that the operating parts of the device include essentially, as already stated, a bell-shaped resonant body 1, a flexible drive shaft 2, and an impact member or hammer. In Figs. 2, 3 and 4, the impact member, which is indicated by the numeral 3, is shown as in the form of a flat tongue loosely mounted at one end upon an upstanding pin 4 set eccentrically into a disk 5, rigidly secured to the solid upper end portion of the shaft. The lower end of said shaft is provided with a gear 6 which meshes with a larger gear 7 fastened to the hub of the adjacent front wheel 8 of the car. By reason of this construction, it will be apparent that when the car is in motion, the rotation of the disk will likewise be effected, the speed of such rotation being directly proportional to that at which the car is driven.

The free end of the impact member is connected by a retractile spring 9 with a threaded bolt 10 adjustably carried by a lug 11 formed upon the disk 5, the adjustment of the bolt serving to vary the tension of the spring, as will be apparent. In order to retain the bolt in adjusted position, it is provided with a nut 12 arranged to be tightened against the adjacent face of the lug.

In the form of the invention shown in Fig. 5, the supporting pin 4 is omitted, and the impact member 30 is mounted directly upon the drive shaft and eccentrically of the same.

The rotating disk is surrounded by a metal ring 13 in which is formed a circular series of relatively long slots 14 located at equal distances apart from each other. These slots are arranged in the plane of the impact member.

The bell, disk and ring are inclosed within a two-part case 15 which is arranged to rest upon the floor of the car directly adjacent the dash-board, as shown in Fig. 1, said case comprising cover and base members 16 and 17 having a hinge connection 18 therebetween. The slotted ring 13 is adapted to rest upon the base member of the case, and is held in place in any preferred manner, while the bell is suspended directly from the top of the cover and is arranged for movement with the latter, the lower portion of the bell lying in close proximity to the ring.

As will be apparent from the foregoing, the direct attachment of the disk to the drive shaft will cause the disk to rotate when the car is in motion, the impact member being carried around with the disk, this being true of both forms of the invention above described. If then, the speed of the car be increased to an extent sufficient to enable the centrifugal force thus exerted upon the impact member to overcome the tension of the spring, said member will fly outward, and its free end will pass successively through the slots 14 in the ring as the same are reached during such rotation, and will come sharply into contact with the bell, thereby sounding the latter. Moreover, it is designed that the slots shall be spaced sufficiently far apart from each other to occasion an appreciable interval between the sounds emitted by the bell. Consequently, it may be stated that the given signal to warn the driver of the car to reduce speed is in the nature of a series of sharp strokes upon the bell in quick succession, the signaling mechanism being automatically actuated when the prescribed speed is reached.

In the two modified forms of the invention shown in Figs. 6, 7, 8 and 9, the changes are in the construction of the resonant body or bell and the impact member, and in the manner in which the latter is mounted, rather than in the operation of the device itself. It is to be assumed, therefore, that in both instances the operating parts of the device are inclosed in a case identical in construction with that shown in Fig. 2. The manner in which the case is locked, and the reasons for the provision of locking means therefor will be hereinafter explained at length.

With reference to the resonant body or bell, the changes above referred to consist merely in forming upon the inner surface thereof a series of inwardly-extending lugs or projections 19. These projections are arranged at equidistant intervals and occupy a common plane, which plane, in the construction shown in Figs. 6 and 7, is that in which the impact member moves, said member having the same shape as that shown in Figs. 2, 3, 4 and 5. The formation of the projections obviates the necessity for the employment of the slotted ring, since the intermittent sounding of the bell is effected by the spaced arrangement of said projections, the impact member striking one projection, and, on passing the same, flying outward to a slightly greater extent until the next projection is reached, without, however, coming into contact with the bell body during such outward movement. In other words, the impact member comes into contact with the projections only, the dimensions of the various parts being so proportioned as to effect this result. The impact member may, if preferred, be mounted directly upon the drive shaft, as in the construction shown in Fig. 5, further illustration being considered unnecessary.

In the construction shown in Figs. 8 and 9, the solid upper portion of the drive shaft 2 is extended up to within a short distance of the top of the bell, and to the terminal of such extension the impact member 33 is pivoted, said member being in the form of a hammer, as illustrated. This member hangs downward, and is held at an angle to the shaft by means of the spring 21, its weighted or enlarged free end being normally below the plane of the projections 19. Therefore, when the requisite rotary movement is imparted to the shaft, and the speed of such rotation becomes sufficiently high, the impact member will swing outward and upward under the centrifugal force exerted thereupon and on reaching the plane of the projections, will strike the same as in the preceding construction.

By reason of the formation of the projections, and the consequent omission of the slotted ring, it will be apparent that the wear upon the impact member is decreased to a very material extent, since the impact member contacts only with the projections and then only when the speed reaches the point where the actuation of the signal takes place. On the other hand, where the ring is made use of, the impact member will contact with the ring almost as soon as the centrifugal force exerted upon it becomes sufficient to overcome the tension of the spring, and such contact will continue to exist so long as said force does not fall below that point.

With respect to the case, it may be further stated that the base members 16 and 17 thereof are preferably locked together by a padlock or similar fastener 22, the employment of which prevents access to the operating parts of the instrument. These parts are intended to be thoroughly tested by a government official prior to the application of the padlock, upon which latter an official seal 24 is to be placed at the conclusion of the test, when the same is successful, thereby indicating the accuracy of the instrument.

The invention also contemplates the coating of the inner surface of the bell with chalk, so that when the signal is actuated, the contact of the impact member against such surface leaves a mark thereon. A similar result may also be obtained by chalking the surface of said member, or by blackening such surface, and it may also be obtained by blackening said surface and chalking that of the bell, and vice versa. In any one of the instances enumerated, the appearance of the mark upon the bell surface will afford positive evidence of the actuation of the signal.

Further description of the invention, its advantages and its mode of operation is deemed unnecessary.

What is claimed is:

1. The combination of a case consisting of a base and a cover; a signaling device inclosed within said case and comprising a resonant body, a rotatable member, an impact member carried by said rotatable member for rotation therewith, means for normally holding said impact member in inoperative position, and means for driving said rotatable member, to cause said impact member to move outwardly under the centrifugal force exerted thereon, to strike said body; and means for locking said cover and base together, to prevent access to said signaling device.

2. The combination of a two-part case having its members hinged together; a signaling device inclosed within said case and comprising a resonant body, a rotatable member, an impact member carried by said rotatable member for rotation therewith, means for normally holding said impact member in inoperative position, and means for driving said rotatable member, to cause said impact member to move outwardly under the centrifugal force exerted thereon, to strike said body; and means for locking the members of said case together, to prevent access to said signaling device.

3. The combination of a case consisting of a base, and a cover hinged thereto; a signaling device inclosed within said case and comprising a resonant body attached to said cover for movement with the same, an impact member carried by said rotatable member for rotation therewith, means for normally holding said impact member in inoperative position, and means for driving said rotatable member, to cause said impact member to move outwardly under the centrifugal force exerted thereon, to strike said body; and means for locking said cover in closed position to prevent access to said signaling device.

4. The combination of a case consisting of a base, and a cover hinged thereto; a signaling device inclosed within said case and comprising a resonant body suspended at its center from said cover for movement with the same, an impact member carried by said rotatable member for rotation therewith, means for normally holding said impact member in inoperative position, and means for driving said rotatable member, to cause said impact member to move outwardly under the centrifugal force exerted thereon, to strike said body; and means for locking said cover in closed position, to prevent access to said signaling device.

5. A signaling device comprising, in combination, a resonant body; a disk encircled by said body and provided with a lug; a bolt adjustably carried by said lug; means for holding said bolt in adjusted position; an impact member eccentrically pivoted to said disk; a spring connection between said bolt and member for normally holding the latter in inoperative position; and means for rotating said disk, to cause said member to strike said body when the centrifugal force exerted upon said member exceeds the tension of said spring.

6. A signaling device comprising, in combination, a resonant body; a slotted ring encircled by said body; a rotatable member; an impact member carried by said rotatable member, for rotation with the same; means for normally holding the said impact member in inoperative position; and means for driving said rotatable member to cause said impact member to move outwardly, under the centrifugal force exerted thereon, through the slot in said ring, to strike said body.

7. A signaling device comprising, in combination, a resonant body; a ring encircled by said body and formed with a circular series of slots; a rotatable member disposed within said ring; an impact member carried by said rotatable member for rotation with the same; means for normally holding said impact member in inoperative position; and means for driving said rotatable member, to cause said impact member to move outwardly, under the centrifugal force exerted thereon, through the successive slots in said ring, to strike said body at intervals.

8. A signaling device comprising, in combination, a resonant body; a slotted ring encircled by said body; a disk encircled by said ring; an impact member pivoted to said disk for rotation therewith; means for normally holding said impact member in inoperative position; and means for rotating said disk, to cause said impact member to move outwardly, under the centrifugal force exerted thereon, through the slot in said ring, to strike said body.

9. A signaling device, comprising, in combination, a resonant body; a ring encircled by said body and formed with a circular series of slots; a disk encircled by said ring; an impact member pivoted eccentrically to said disk; means for normally holding said impact member in inoperative position; and means for rotating said disk to cause said impact member to move outwardly, under the centrifugal force exerted thereon, through the successive slots in said ring, to strike said body at intervals.

10. A signaling device comprising, in combination, a resonant body; a slotted ring encircled by said body; a disk encircled by said ring; a flat tongue pivoted to said disk in the plane of the slot in said ring; means for normally holding said tongue in inoperative position; and means for rotating said disk, to cause said tongue to swing outwardly under the centrifugal force exerted thereon, through said slot, to strike said body.

In testimony whereof I have hereunto set my hand in presence of two subscribing witnesses.

ROBERT B. TENNEY, Jr.

Witnesses:
 MARCUS WING,
 ROBERT D. MEERE.

---

Copies of this patent may be obtained for five cents each, by addressing the "Commissioner of Patents, Washington, D. C."